Dec. 11, 1923.
R. A. LANGENBACHER
HOG HOLDER
Filed Oct. 25, 1922
1,476,895
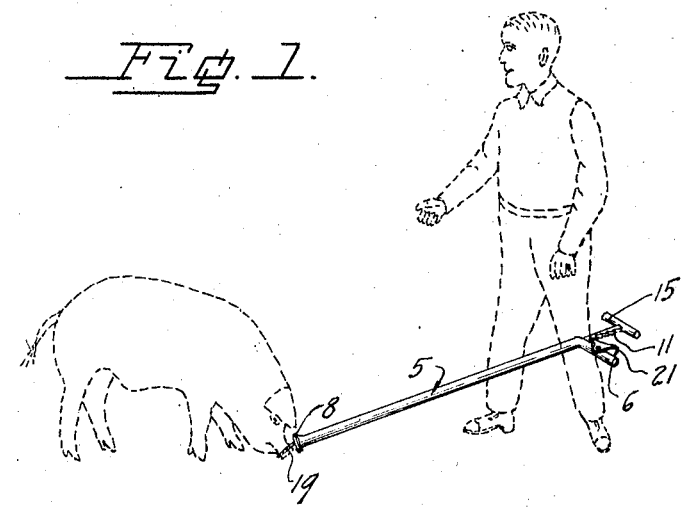
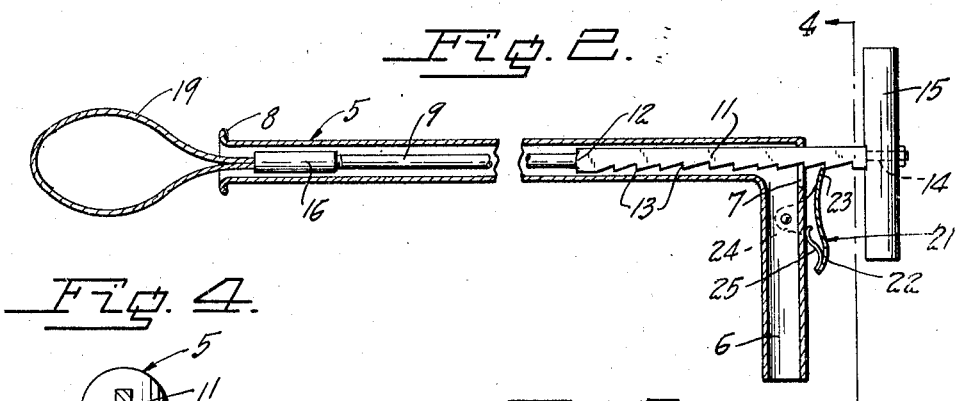
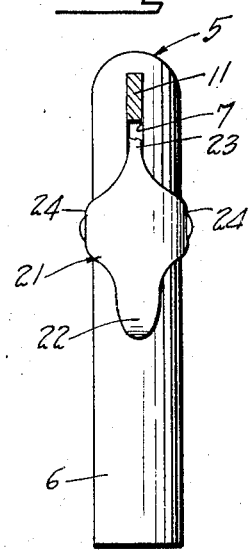
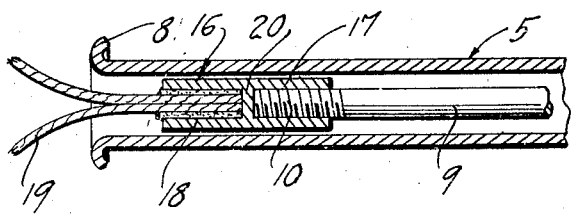
Inventor
R. A. Langenbacher
By Watson E. Coleman
Attorney Patented Dec. 11, 1923.

1,476,895

UNITED STATES PATENT OFFICE.

ROBERT A. LANGENBACHER, OF ST. CHARLES, MISSOURI.

HOG HOLDER.

Application filed October 25, 1922. Serial No. 596,820.

*To all whom it may concern:*

Be it known that I, ROBERT A. LANGENBACHER, citizen of the United States, residing at St. Charles, in the county of St. Charles and State of Missouri, have invented certain new and useful Improvements in Hog Holders, of which the following is a specification, reference being had to the accompanying drawings.

This invention relates to hog holders, and has for its object to provide means whereby the hog can be readily caught and held for ringing and other treatment.

It is another object of the invention to provide a device of this character wherein the casing of the holding means is provided with means for holding the holding means in its operative position.

It is a further object of the invention to provide a hog holder of this character wherein the casing of the device is provided with means for holding the actuating means in various adjusted positions and wherein said holding means may be adjusted with respect to the casing to permit a fine adjustment of the actuating means.

It is a further object of the invention to provide a device of this character wherein the casing is provided with means whereby the entire device may be supported to hold the animal and at the same time permit the operator to use both hands in the treating of the animal without danger of the animal escaping.

With these and other objects in view, the invention consists in the improved construction and arrangement of parts to be hereinafter more particularly described, fully claimed and illustrated in the accompanying drawings, in which:—

Figure 1 is a perspective view of a hog holder showing the same in use and engaged with the leg of the operator:

Figure 2 is a longitudinal sectional view;

Figure 3 is a fragmentary sectional view of the socket member and the casing; and Figure 4 is a section taken on the line 4—4 of Figure 2.

Referring to the drawings, 5 designates a tubular member or casing having its end portion 6 extended at right angles to the body portion 5 of the casing to provide a handle and a support, the handle being relatively long for a purpose to be hereinafter described.

The casing 5 at the junction of the handle portion 6 with the casing is provided with an elongated opening 7, said opening extending longitudinally with respect to the handle 6. The opening 7 extends transversely of the casing 5, and also inwardly of the handle 6. The lower end portion 8 of the casing is provided with a flange or bead which serves as a guide in the operation of the device.

In connection with the casing, an actuating member is provided, said member comprising a rod 9 having its end portion 10 threaded. The central portion of the member 9 is substantially circular in cross section. The end portion 11 of the rod 9 is flattened and is substantially rectangular in cross section, the junction of the flattened end portion with the central portion of the rod being provided with shoulders 12.

One longitudinal edge of the flat end portion is provided with a plurality of teeth 13 which permit the end portion 11 to substantially serve the purpose of a rack. The extremity 14 of the end portion 11 is reduced to extend through an opening provided in a handle member 15, by means of which the actuating member is operated. The actuating member 9 is adapted to be slidably disposed within the casing 5, the flattened end portion 11 being slidable through the elongated opening 7 with the teeth facing the handle 6.

The opening 7 is slightly greater in width than the width of the flattened end portion 11. This permits unobstructed movement of the flat portion 11 through the opening, but prevents the central portion of the rod from passing therethrough in view of the stops afforded by the shoulders 12. These stops engage the lower edges of the opening 7, thus limiting movement of the actuating member in one direction.

A socket member 16 is provided, said socket member having its end portion 17 interiorly threaded for the reception of the threaded end 10 of the rod 9. The opposite end portion 18 of the socket member is intended to receive the ends of a flexible loop member 19. This member may be made of any desired material, preferably a cable made of fine strands of wire, the ends of the cable being disposed within the end portion 18 of the socket. A partition 20 is disposed inwardly of the socket member and serves as a stop for the socket member to limit movement of said socket member longitudinally of the rod 9. It also permits the socket member to be divided into two compartments. The compartment in which the ends of the cable 19 are disposed is intended to receive solder or other means for firmly securing the ends of the flexible member within the end 18 of the socket member. In view of the beaded end 8 of the casing 5 the loop member may be readily guided into the casing without danger of the same catching on the edge of the casing.

In order that the actuating member may be held in various adjusted positions, a pawl 21 is provided. This pawl includes a finger piece 22 at one end thereof and a tooth 23 at its opposite end. Extending from the side portions of the body of the pawl are ears 24 which are adapted to straddle the handle 6 adjacent the opening 7, the finger piece 22 and tooth 23 being spaced from the upper surface of the handle. A leaf spring 25 is secured at one end to the lower face of the finger piece 22 and is engaged at its opposite end with the portion of the handle disposed between the ears 24. The tooth 23 is made relatively long so that in the adjustment of the device it is possible for the tooth, if necessary, to enter the elongated opening 7 to permit a very fine adjustment. This permits the device to be used on any hog, regardless of the size of the snout of the hog.

In the use of the device, the handle member 6 is grasped by the operator and the pawl swung away from the opening 7 to release the actuating member, whereupon the actuating member may be moved through the casing by means of the handle 15 so as to increase the size of the loop member 19. The loop member may then be easily placed over the snout of the hog without frightening the hog. The tightening member may be drawn upwardly through the casing by the handle 15 without requiring actuation of the pawl, as it is possible for the pawl to ride freely over the teeth during upward movement of the actuating member. The spring of the pawl urges the pawl into engagement with the teeth of the actuating member. This causes the actuating member to be forced into engagement with the adjacent end face of the opening 7. In this way the casing cooperates with the pawl to produce a clamping operation.

After the loop member has been adjusted to the size desired it is not necessary for the operator to hold the casing 5 by means of the handle 6, as it is possible for the operator to place the handle 6 behind his right leg, or engage the handle 6 with a fence post or like upright. This holds the hog without danger of the loop becoming unfastened and permits the operator to use both hands in the treatment of the hog. If necessary, a chain, rope or like fastening device may be engaged with the handle and a support. This particular advantage of the handle 6 does not interfere in any way with the holding operation of the actuating member 9 and the loop 19, nor does it interfere with the pawl 21, as the pawl projects from the upper or outer face of the handle and not from the face intended to engage the leg of the operator or a fence post.

From the foregoing it will be readily seen that this invention provides a novel form of hog holder capable of being readily adjusted and applied to the snout of the animal and wherein the casing not only provides a handle for facilitating adjustment of the actuating member, but wherein said handle serves as means whereby the casing may be held without requiring the operator to hold the casing with either hand. All of these features are possessed by a device composed of only a small number of simple parts.

What is claimed is:—

1. A hog holder comprising a casing, one end portion of said casing being extended laterally with respect to the major portion of the casing to provide a handle, said casing having an opening at the junction of the handle with the casing, an actuating member slidable in said opening, one end of said member having a loop member secured thereto, the opposite end of said member having teeth, a pawl pivoted on and arranged longitudinally of the handle adjacent said opening for engagement with the teeth of the actuating member, and a further handle member carried by the end of the actuating member adjacent the handle of the casing.

2. A hog holder comprising a tubular casing, one end portion of said hog holder being extended outwardly substantially at right angles to provide a relatively long handle member, that portion of the handle extending over the casing at the junction of the handle with the casing being provided with an elongated opening, said opening extending partially into the handle, an actuating rod slidable in the casing, one end of said rod being flattened for movement through the opening of the casing, one edge of said flattened end portion being provided with teeth, a pawl adapted to straddle the handle of the casing adjacent the junction of the handle with the casing, said pawl being disposed for locking movement upon the handle and adapted at times to move inwardly of the opening of the casing, said handle providing means whereby the casing member may be held in engagement with a support independently of the hands of the operator.

In testimony whereof I hereunto affix my signature.

ROBERT A. LANGENBACHER.